United States Patent
Liu et al.

(10) Patent No.: US 10,086,442 B2
(45) Date of Patent: Oct. 2, 2018

(54) DRILL CHUCK

(75) Inventors: Yaoting Liu, Weihai (CN); Zuozi Yu, Weihai (CN)

(73) Assignee: WEIHAI DAWANG HARDWARE PRODUCTS LIMITED, Weihai (CN)

( * ) Notice: Subject to any disclaimer, the term of this patent is extended or adjusted under 35 U.S.C. 154(b) by 360 days.

(21) Appl. No.: 14/414,273

(22) PCT Filed: Jul. 17, 2012

(86) PCT No.: PCT/CN2012/078743
§ 371 (c)(1),
(2), (4) Date: Jan. 12, 2015

(87) PCT Pub. No.: WO2014/012215
PCT Pub. Date: Jan. 23, 2014

(65) Prior Publication Data
US 2015/0209871 A1  Jul. 30, 2015

(51) Int. Cl.
*B23B 31/12* (2006.01)
*B23B 31/16* (2006.01)

(52) U.S. Cl.
CPC .... *B23B 31/16083* (2013.01); *B23B 31/1207* (2013.01); *B23B 31/1215* (2013.01); *B23B 2231/24* (2013.01); *B23B 2260/07* (2013.01); *B23B 2260/106* (2013.01); *Y10T 279/17666* (2015.01)

(58) Field of Classification Search
CPC ............ B23B 31/1207; B23B 31/1215; B23B 2260/07; B23B 2260/106; Y10T 279/17666
See application file for complete search history.

(56) References Cited

U.S. PATENT DOCUMENTS 1,885,790 A * 11/1932 Amyot ................ B23B 31/1246
279/63
2,055,916 A * 9/1936 Tautz .................. B23B 31/1207
279/60

(Continued)

FOREIGN PATENT DOCUMENTS

CN       101032759 A    9/2007
CN       200967095 Y   10/2007

(Continued)

OTHER PUBLICATIONS

International Search Report dated Apr. 18, 2013, issued in corresponding application No. PCT/CN2012/078743.

*Primary Examiner* — Daniel Howell
*Assistant Examiner* — Paul M Janeski
(74) *Attorney, Agent, or Firm* — Westerman, Hattori, Daniels & Adrian, LLP

(57) ABSTRACT

The present invention provides a new drill chuck that resolves the problem that the excessive clamping force of the existing drill chuck makes it inconvenient to open the drill chuck and easily damages the cutters. The new drill chuck comprises a front-body, an after-body, and clamping jaws, wherein a thread is provided on the clamping jaw, the after-body is provided with master gears, slave gears are provided between the clamping jaws and the after-body, the master gear fits with the slave gear, a thread is provided inside the slave gear, and the thread of the slave gear fits with the thread of the clamping jaw.

5 Claims, 5 Drawing Sheets

(56) References Cited

U.S. PATENT DOCUMENTS

| | | | | |
|---|---|---|---|---|
| 3,868,831 | A * | 3/1975 | Stock | B23B 31/1253 279/55 |
| 4,305,597 | A * | 12/1981 | McCarty | B23B 31/1253 279/22 |
| 5,267,741 | A * | 12/1993 | Leitner | B23B 31/1238 279/140 |
| 5,503,409 | A * | 4/1996 | Rohm | B23B 31/123 279/140 |
| 7,722,300 | B1 * | 5/2010 | Corcoran | B23B 31/1238 279/62 |
| 2002/0063401 | A1 * | 5/2002 | Huggins | B23B 31/1071 279/137 |
| 2005/0024253 | A1 | 2/2005 | Adamiecki et al. | |
| 2006/0232021 | A1 * | 10/2006 | Schell | B23B 31/1253 279/60 |
| 2010/0109262 | A1 * | 5/2010 | Yu | B23B 31/123 279/60 |
| 2011/0227299 | A1 * | 9/2011 | Yu | B23B 31/1253 279/60 |

FOREIGN PATENT DOCUMENTS

| | | |
|---|---|---|
| CN | 201023137 Y | 2/2008 |
| CN | 201055921 Y | 5/2008 |
| CN | 101412117 A | 4/2009 |
| WO | 2011/095725 A1 | 8/2011 |

* cited by examiner

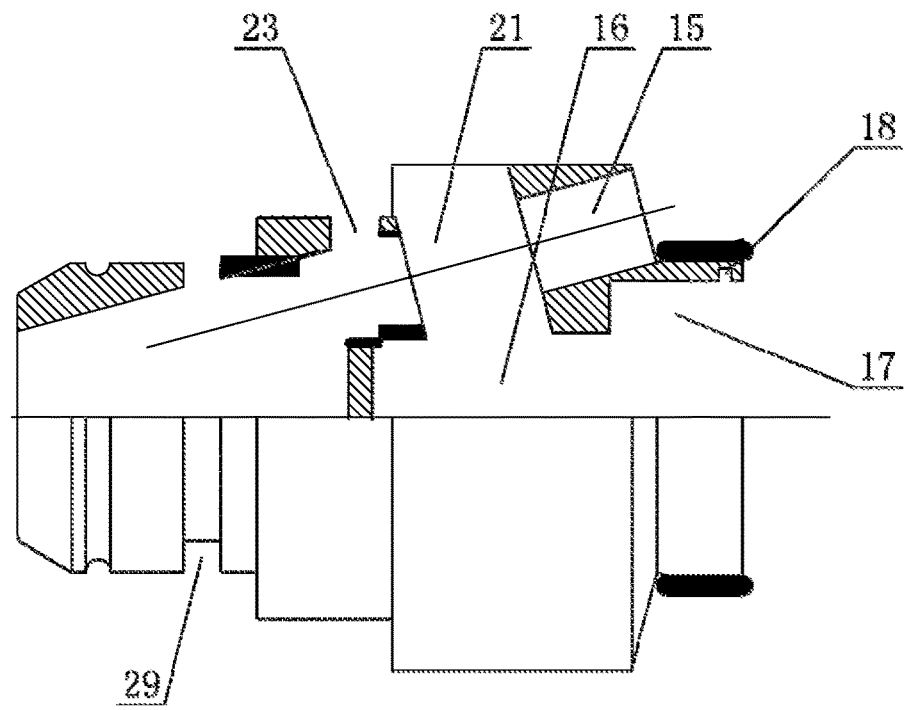
Figure 2
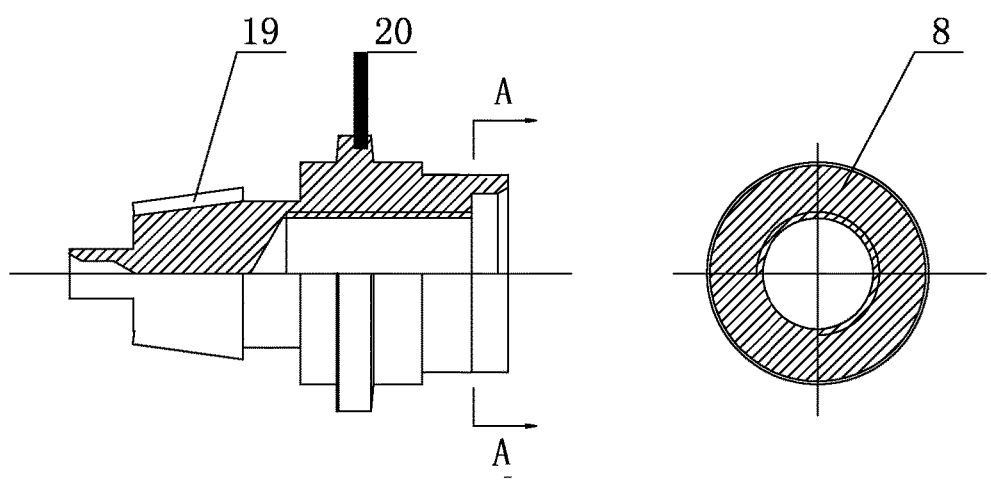
Figure 3
Figure 4

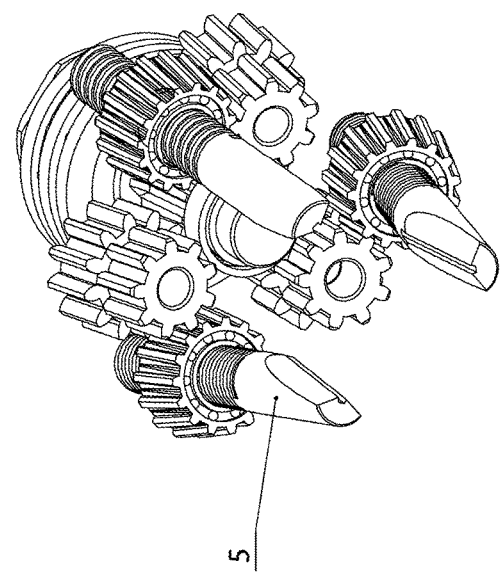
Figure 10-B
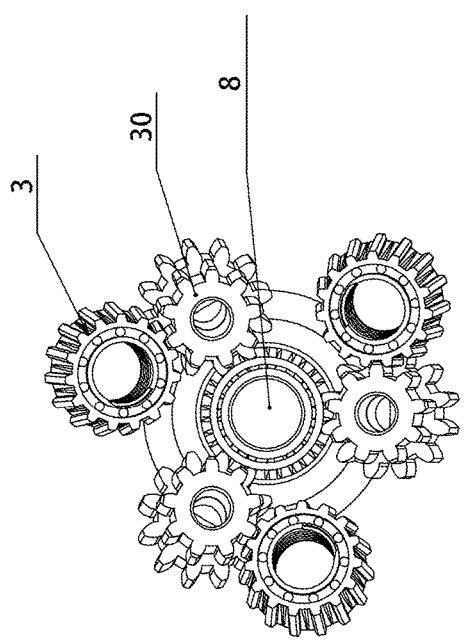
Figure 10-A
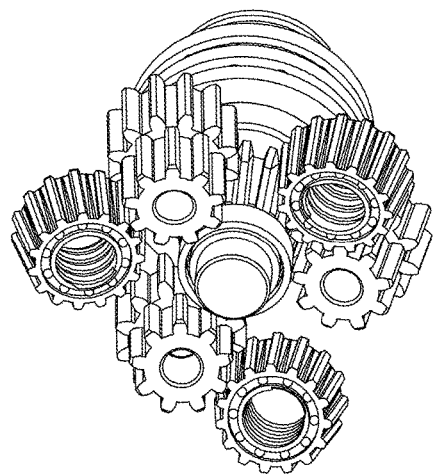
Figure 10-C

DRILL CHUCK

TECHNICAL FIELD

The present invention relates to a fixture of cutters for mechanical processing, and particularly to a new drill chuck that is easy to open as well as protects cutters.

BACKGROUND ART

In production and processing activities, machine tools, electrical drills and other tools are often used for boring, milling and other operations. The drill chucks mounted on the working shafts of main engines of such equipment for holding bits, milling cutters and other cutters have been applied and improved for long, but are still observed with various deficiencies. By the source of the force in the drill chuck for pushing the clamping jaw to move up and down inside the clamping jaw hole, drill chucks are mainly classified into the following three types:

The first one is the drill chuck that provides, from outside of the clamping jaw, the force for the clamping jaw to move up and down. Such drill chuck generally has the partial thread outside the clamping jaw. Such thread fits with the thread on the screw nut in the drill chuck jacket. When the drill chuck jacket rotates transversely, the screw nut will be driven to move up and down in the clamping jaw hole.

The second one is the drill chuck that provides, from inside of the clamping jaw, the force for the clamping jaw to move up and down. Such drill chuck generally has the thread inside the clamping jaw. Such thread fits with the thread on drill chuck after-body. When the drill chuck after-body rotates transversely, the clamping jaw will, along with the after-body, move up and down inside the clamping jaw hole.

The third one is the drill chuck that provides, from top of the clamping jaw, the force for the clamping jaw to move up and down. The tops of all the clamping jaws inside this type of drill chuck are fixed to one push block. Through the up-and-down movement of the push block, the clamping jaw moves up and down inside the clamping jaw hole.

The major problem with these types of drill chucks is: when these drill chucks are applied to electrical drills or other tools that rotate and knock in operation, such lasting knocking force will drive the clamping jaw to clamp the cutters continuously and cause an excessive clamping force, thus leaving pits on the cutters and damaging the cutters. In addition, when the drill chuck stops or requires for replacement of cutters, due to the effect of the excessive clamping force generated by the clamping jaw to the cutters under the lasting knocking force, the drill chuck cannot be easily opened, making it much difficult to operate.

SUMMARY OF THE INVENTION

In view of the technical problem that the excessive clamping force of the existing drill chucks damages cutters and makes it hard to open the drill chuck, the present invention provides a new drill chuck that can protect cutters as well as can be easily opened.

For this purpose, the present invention has a front-body, an after-body, and clamping jaws, wherein a thread is provided on the clamping jaw, the after-body is provided with master gears, slave gears are provided between the clamping jaws and the after-body, the master gear fits with the slave gear, a thread is provided inside the slave gear, and the thread of the slave gear fits with the thread of the clamping jaw.

A preferred technical solution of the present invention is that an intermediate gear is further provided between the master gear and the slave gear.

A further preferred technical solution of the present invention is that at least one rolling bearing is provided between the front-body and the after-body.

A still further preferred technical solution of the present invention is that a partition is further provided on the front-body.

A still further preferred technical solution of the present invention is that the clamping jaw is provided with a positioning ball groove, a positioning ball is provided inside the positioning ball groove, and the positioning ball is fixed inside the front-body.

A still further preferred technical solution of the present invention is that an oil sump is provided on the front-body.

With the present invention, since the master gear at the lower end of the after-body fits with the slave gear, the inner thread of the slave gear fits with the thread of the clamping jaw, and the slave gear is fixed relative to the front-body, when the drill chuck is applied to an electrical drill or other tools that continuously knock in operation, the clamping jaw is limited by the gears and thus will not clamp the cutter constantly. Accordingly, an appropriate clamping force is maintained, and thus the problem that the drill chuck is difficult or even impossible to open is avoided. At the same time, the cutter is protected, and thus no pit due to the excessive clamping force will be left on the cutter.

BRIEF DESCRIPTION OF THE DRAWINGS

FIG. 2 is a half-section view of the front-body of the present invention;

FIG. 3 is a half-section view of the after-body of the present invention;

FIG. 4 is an A-A view in FIG. 3;

FIG. 10-A is a front view of the after-body of the present invention. FIG. 10-B is a perspective view of the slave gear and intermediate gear of the present invention. FIG. 10-C is a perspective view of the slave gear and intermediate gear of the present invention.

LEGENDS

1. Front-body; 2. Steel ball fixing ring; 3. Slave gear; 4. Bearing cover; 5. Clamping jaw; 6. Bearing pad; 7. Inner circlip; 8. After-body; 9. Rear sleeve; 10. Front sleeve; 11. Front outer circlip; 12. Contact ball bearing; 13. Contact balls; 14. Positioning ball; 15. Clamping jaw hole; 16. Front groove; 17. Rear groove; 18. Circlip groove; 19. Master gear; 20. After-body hump; 21. Gear groove; 22. Positioning ball groove; 23. Opening; 24. Upper ring groove; 25. Lower ring groove; 26. Steel balls; 27. Main engine connecting hole; 28. Cutter hole; 29. Ring oil sump.

DESCRIPTION OF THE EMBODIMENTS

Figure 1:
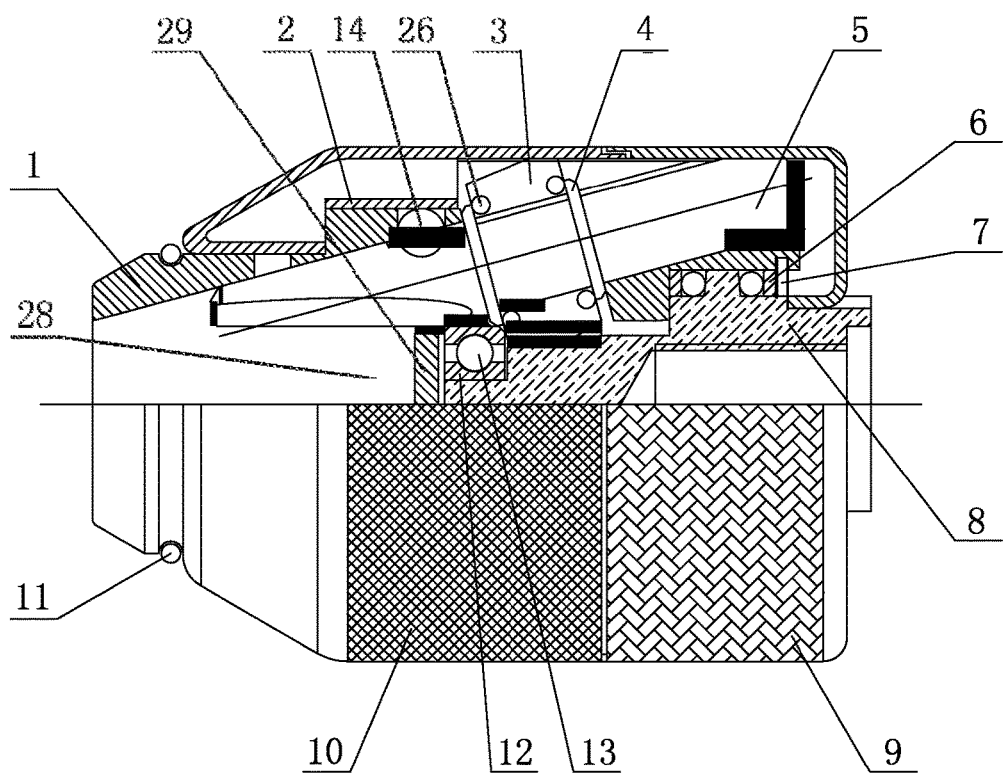
FIG. 1 is an assembly diagram of the overall structure of the present invention.

As FIG. 1 shows, the present invention mainly includes front-body 1, after-body 8, front sleeve 10, rear sleeve 9, clamping jaws 5, slave gears 3. After-body 8 is built in the front-body 1, and can only rotate transversely relative to the front-body 1. The front-body 1 has the clamping jaw hole 15. The clamping jaw 5 is located inside the clamping jaw hole 15. The slave gear 3 has the inner thread, which fits with the outer thread of clamping jaw 5. At the lower end of after-body 8 is master gear 19. The master gear 19 fits with slave gear 3. When after-body 8 rotates, slave gear 3 also rotates accordingly. Clamping jaw 5 is driven by gear 3 to move up and down.

As FIGS. 2~4 show, in the center position inside the rear end of front-body 1 are front groove 16 and rear groove 17. When after-body 8 is inserted into front-body 1, after-body 8 just fits with the two grooves. At the position on after-body 8 closest to the central part of front-body 1, i.e. the forefront of after-body 8, are contact ball bearing 12 and one circle of contact balls 13 around the circumference of the front end of after-body 8. Thus, when after-body 8 rotates, the sliding friction between after-body 8 and front-body 1 becomes the rolling friction, reducing the friction force greatly and increasing flexibility of drill chuck.

Similarly, on both left and right sides of after-body hump 20 is one circle of such contact balls, which can play the same role. At the right end of contact balls on the right side of after-body hump 20 is bearing pad 6, which presses the contact balls at the right end of after-body hump 20. At the position close to the outside on rear groove 17 is circlip groove 18. An inner circlip 7 is pinched tightly by hand to be pressed onto bearing pad 6. After releasing the hand, inner circlip 7 restores elasticity, and is just stuck inside circlip groove 18 upon expanding, thus playing a role of stop. Accordingly, after-body 8 can only move transversely relative to front-body 1, and can not move radially relative to front-body 1. No special positioning device is required for fixing the contact balls on the left side of after-body hump 20, because on the right side of these contact balls is after-body hump 20 and on the left side is the inner wall of front-body 1.

On front-body 1, obliquely symmetrically processed are three clamping jaw holes 15 running through up and down, and clamping jaws 5 are located inside clamping jaw holes 15. Front-body 1 also has three obliquely symmetric gear grooves 21, and slave gears 3 are located in gear grooves 21. Inside the front end of front-body 1 is the cutter hole 28, which does not communicate with the groove in which after-body 8 is located, because a partition is provided between the two. This can prevent the blowing dust from entering the rear part of the drill chuck in operation, thus effectively separating dust as well as avoiding the damage to afterbody 8 when the cutter goes directly against after-body 8 without partition.

Additionally, at the front end of front-body 1 is processed a ring oil sump 29, which can be continuous, or can be arranged in correspondence with the three clamping jaws 5 in a non-continuous status. Lubricating grease is sealed in the ring oil sump 29 to ensure the clamping jaw 5 can cut into the lubricating grease of the inner ring in the process of moving up and down. Since the part processed with ring oil sump fits closely with the outer sleeve 10 of the drill chuck, the lubricating grease will not leak outward. With the ring oil sump 29 arranged, in the process of moving up and down, clamping jaw 5 can cut into the lubricating grease therein. Thus, the friction force between the whole clamping jaw 5 and the front-body 1 is reduced, the duration of flexibility of clamping jaw 5 is prolonged, and hence the useful life of the drill chuck is prolonged.

Figure 7:
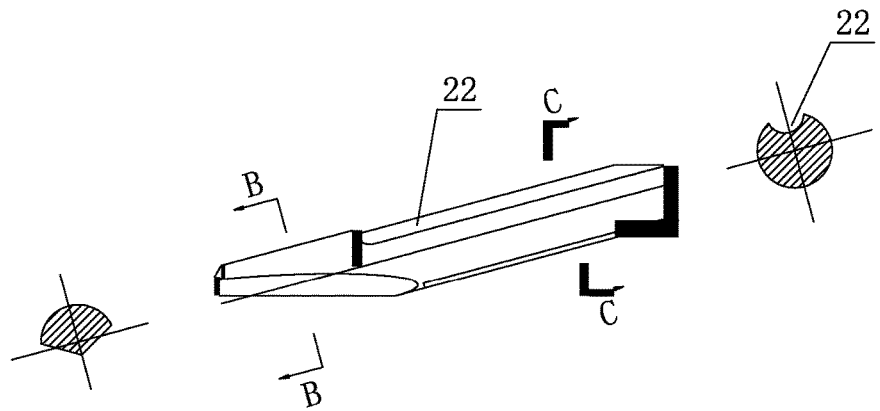
FIG. 7 is a structural view of the clamping jaw of the present invention.

As FIG. 7 shows, FIG. 7-A is a structural view of the clamping jaw, FIG. 7-B is a B-B view of FIG. 7-A, and FIG. 7-C is a C-C view of FIG. 7-A. Around the outer circumference of clamping jaw 5 is arranged the thread (not indicated in the figure), which fits with the thread inside slave gear 3. On clamping jaw 5 is also arranged the positioning ball groove. The clamping jaw 5 is placed after the clamping jaw hole 15. The lower part of the positioning ball 14 is located inside the positioning ball groove 22 and its upper part in the opening 23 of the front-body 1. The circumferential surface, where the opening 23 of the front-body 1 is located, is covered with the steel ball fixing ring 2, to prevent the positioning ball 14 from rolling outward. In this way, when the clamping jaw 5 moves up and down, due to the effect of the positioning ball 14 and the positioning ball groove 22, the clamping jaw 5 can move up and down only, and can not rotate transversely, thus playing an excellent role of stop. Accordingly, the clamping force of the clamping jaw 5 on cutters is properly ensured. Without the stop of the positioning ball 14 and the positioning ball groove 22, the clamping jaw 5 will move up and down and simultaneously rotate transversely, and thus can not hold the cutters properly. This causes a significantly unfavorable impact on operation.

Figure 6:
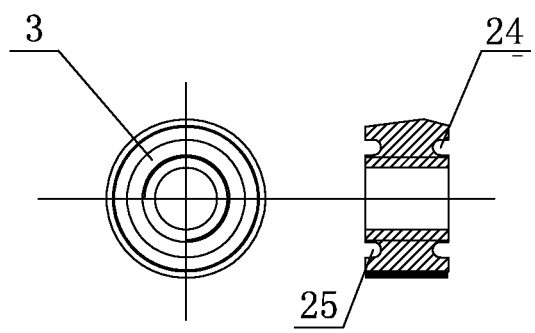
FIG. 6 is a structural view of the slave gear of the present invention.

As FIG. 6 shows, FIG. 6-A is a front view of the slave gear 3 and FIG. 6-B is a left view of the slave gear 3. It can be clearly seen from the figures that the slave gear 3 is a bevel gear, and outside the slave gear 3 is the outer teeth portion, and inside is arranged the inner thread. Its outer teeth fit with the outer teeth of the master gear 19, and the inner thread fits with the thread of the clamping jaw 5. The inner diameter of the slave gear 3 is equal to the outer diameter of the clamping jaw 5. On the upper and lower surfaces of the slave gear 3 are arranged the upper ring groove 24 and the lower ring groove 25 respectively. Inside both the upper ring groove 24 and lower ring groove 25 is evenly placed one circle of steel balls 26. Then, outside the steel balls 26 is arranged the bearing cover 4, to prevent the steel balls 26 from rolling outward. The steel balls 26 and the bearing cover 4 may not be arranged on the slave gear 3, but in that case, for the sake of making the slave gear 3 to rotate flexibly, the slave gear 3 must be quenched, thus increasing the cost. With the steel balls 26 and the bearing cover 4 arranged, the slave gear 3 may not be quenched. Further, the sliding friction is changed into rolling friction, which can also increase the rotating flexibility of the slave gear 3.

Figure 5:
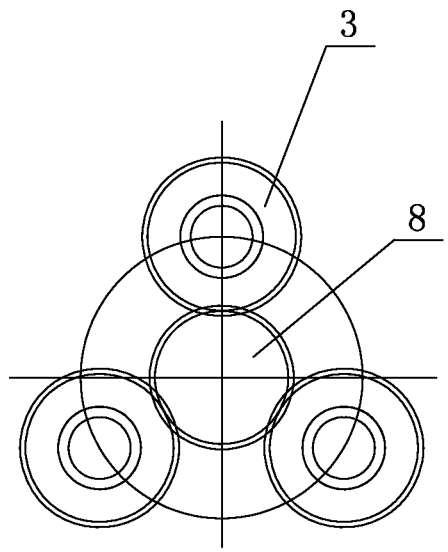
FIG. 5 is a combination view of the slave gear and the after-body of the present invention.
Figure 5:
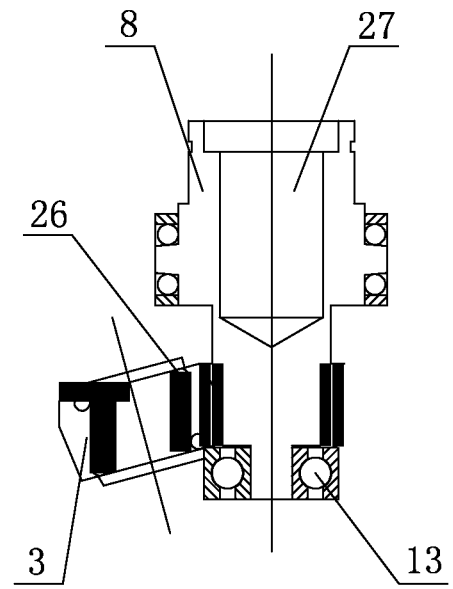

As FIG. 5 shows, FIG. 5-A is a schematic plan view for illustrating the engagement of the three slave gears 3 with the after-body 8, and FIG. 5-B is a front view for the engagement of the slave gear 3 with the after-body 8. On the after-body 8 is arranged the main engine connecting hole 27. When the after-body 8 is in connection with the main engine, the main engine drives the after-body 8 to rotate, so that the master gear 19 drives the slave gear 3 to rotate and further drives the clamping jaw 5 in the slave gear 3 to move up and down.

In addition, between the master gear 19 and the slave gear 3, an intermediate gear 30 can also be arranged. The master gear 19, slave gear 3 and intermediate gear 30 are connected by teeth. Through the intermediate gear 30, the master gear 19 drives the slave gear 3 to rotate and further drives the clamping jaw 5 to move up and down.

Figures 8, 9:
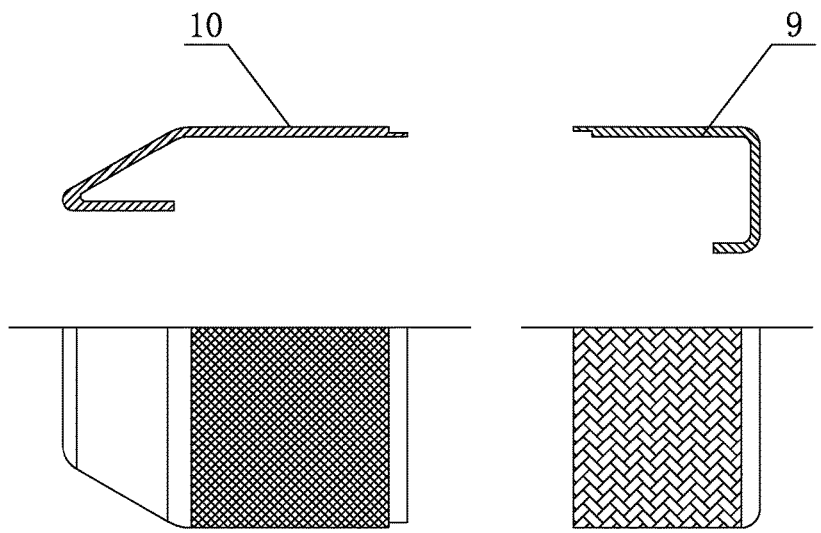
FIG. 8 is a half-section view of the front sleeve of the present invention.
FIG. 9 is a half-section view of the rear sleeve of the present invention.

As FIG. 8 and FIG. 9 show, the present invention also has the front sleeve 10 and rear sleeve 9. The end of the front sleeve 10 fits with the front end of the rear sleeve 9 to form a complete drill chuck. At the front end of the front-body 1 is arranged the front outer circlip 11, of which the inner ring portion is stuck in the groove at the front end of the front-body 1. And the outer ring portion is exposed outside the front-body 1 to fix the front sleeve 10 so that the front sleeve 10 will not slide off. At the rear end of the after-body 8 are arranged two symmetric grooves. When the rear sleeve 9 is sleeved on the after-body 8, the portion bending inward at the tail end of the rear sleeve 9 is just stuck inside the two grooves, to form a relative fixed connection with the after-body 8. When rotating the rear sleeve 9, the after-body 8 will also rotate accordingly.

The following is the description of the working process of the present invention:

The cutter is inserted into the cutter hole 28 of the front-body 1. The rear sleeve 9 is rotated by hand. Since the after-body 8 is in fixed connection relative to the rear sleeve 9, the after-body 8 will rotate as the rear sleeve 9 rotates. Also, since the master gear 19 on the after-body 8 fits with the slave gear 3, and the slave gear 3 further fits with the clamping jaw 5 by the thread, the rotation of the after-body 8 forces the slave gear 3 to rotate relative to the after-body 8, and the rotation of the slave gear 3 will further drive the clamping jaw 5 to move up and down along the clamping jaw hole 15. The space between the lower ends of the three clamping jaws 5 will be narrowed accordingly till clamping firmly the cutter placed inside the cutter hole 28.

When the main engine connecting hole 27 of the after-body 8 is connected with the working shaft of the main engine, with the equipment motor started, the after-body 8 is driven by the working shaft to rotate at a high speed. Due to the effect of static inertia among the master gear 19 on the after-body 8, slave gear 3 and clamping jaw 5, the relatively high impact, at the initial rotating stage of the after-body 8 and the master gear 19, will force the slave gear 3 and the clamping jaw 5 to rotate together. Such impact further makes the three clamping jaws 5 to firmly clamp the cutter. Then the reaction force between the cutter and the processing piece also forces the clamping jaw 5, the slave gear 3 and the master gear 19 on the after-body 8 to rotate relatively. This also increases the holding force of the three clamping jaws 5 on the cutter, and hence a self-tightening function is provided. Thus, the whole self-tightening drill chuck has an extremely high accuracy and stability. With the motor rotating, the three clamping jaws 5 firmly clamp the cutter and rotate gradually together to complete the mechanical processing.

In the foregoing embodiment, the stop apparatus of the clamping jaw 5 is realized by the positioning ball groove 22, the positioning ball 14 and the steel ball fixing ring 2 on the clamping jaw 5. Such solution is a preferred technical solution, because in this case, the friction between the clamping jaw 5 and the positioning ball 14 is the rolling friction, reducing the friction and thus increasing the moving flexibility of the drill chuck. However, other modes can also be used as alternatives. For instance, on the clamping jaw 5 is arranged a V-type groove, and in the opening 23 of the front-body 1 is arranged the V-type tip, which is fixed with the steel ball fixing ring 2 or other sealing devices. The V-type tip fits with the V-type groove. Thus, in the process of up and down movement of the clamping jaw 5, V-type groove and V-type tip can also stop the clamping jaw 5 so that the clamping jaw 5 will not rotate transversely in the process of moving up and down. For another instance, if the tip is a key, the corresponding groove on the clamping jaw 5 should be rectangular. All in all, the groove of the clamping jaw 5 and the tip that fits with it can be in any shape that can play a role of stop.

In the drill chuck, the slave gears 3 correspond to each other obliquely because the slave gears 3 need to be sleeved on three oblique clamping jaws 5. Therefore, the teeth of the master gear 19 are also oblique and correspond to the bevel slave gear 3. The slave gear 3 may not be arranged as a bevel gear, but it is necessary to ensure that its outer teeth fit with the outer teeth of the master gear 19 and the rotation of the master gear 19 can drive the slave gear 3 to rotate.

For the sake of increasing the rotating flexibility of the after-body 8, in the foregoing embodiment, three sets of rolling bearings are arranged. When it is necessary to consider the cost, one or two sets of such rolling bearings can be arranged; without considering the cost, three or more sets can be arranged.

In order to increase the useful life of the drill chuck, all the ball bodies such as the positioning ball 14, contact balls 13 and steel balls 26 of the present invention are made of wear resistant steel material, but can also be made of other materials that can have the same effect.

A preferred technical solution of the present invention has a ring oil sump 29 to ensure the adequate lubrication and prolong the useful life of the drill chuck. Surely, the oil sump may not be arranged to reduce the processing time and cost to some extent. Besides, the partition 29 arranged in the present invention can effectively prevent dust and protect the after-body 8. In case of any difficulty in processing, the partition may not be arranged and the cutter hole may directly reach the front end of the after-body.

The invention claimed is:

1. A drill chuck comprising a front-body, an after-body, a front sleeve, a rear sleeve, and clamping jaws on which threads are provided, which is characterized in that:
    said after-body is located in said front-body,
    wherein said after-body is provided with a master gear, a slave gear is provided between said clamping jaws and said after-body,
    wherein said master gear fits with said slave gear, a thread is provided inside said slave gear, and the thread of said slave gear fits with the thread of said clamping jaw,
    wherein said clamping jaw is provided with a positioning ball groove, a positioning ball is provided inside said positioning ball groove, and said positioning ball is fixed inside the front-body; and
    wherein said rear sleeve forms a relatively fixed connection with said after-body.

2. The drill chuck according to claim 1,
    wherein at least one rolling bearing is provided between said front-body and said after-body.

3. The drill chuck according to claim 2,
    wherein a partition is provided on said front-body.

4. The drill chuck according to claim 1,
    wherein a ring oil sump is provided on said front-body.

5. The drill chuck according to claim 1,
    wherein at least one rolling bearing is provided between said front-body and said after-body.

* * * * *